(12) United States Patent
Chen et al.

(10) Patent No.: US 12,000,385 B2
(45) Date of Patent: Jun. 4, 2024

(54) DRIVING MECHANISM

(71) Applicant: TDK TAIWAN CORP., Taoyuan (TW)

(72) Inventors: Yung-Yun Chen, Taoyuan (TW);
Kun-Shih Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/076,579

(22) Filed: Dec. 7, 2022

(65) Prior Publication Data

US 2023/0175495 A1 Jun. 8, 2023

Related U.S. Application Data

(60) Provisional application No. 63/286,823, filed on Dec. 7, 2021.

(51) Int. Cl.
| | |
|---|---|
| *F03G 7/06* | (2006.01) |
| *H04N 23/54* | (2023.01) |
| *H04N 23/67* | (2023.01) |
| *H04N 23/68* | (2023.01) |

(52) U.S. Cl.
CPC .......... *F03G 7/062* (2021.08); *F03G 7/0614* (2021.08); *H04N 23/54* (2023.01); *H04N 23/67* (2023.01); *H04N 23/6812* (2023.01); *H04N 23/687* (2023.01)

(58) Field of Classification Search
CPC .......... G02B 27/64; G02B 7/09; G03B 13/36; G03B 5/00
See application file for complete search history.

(56) References Cited

U.S. PATENT DOCUMENTS

| | | | |
|---|---|---|---|
| 2020/0303622 A1* | 9/2020 | Schnetzler | H10N 35/00 |
| 2020/0355910 A1* | 11/2020 | Smolka | G02B 26/0833 |
| 2021/0082604 A1* | 3/2021 | Müllner | H01F 1/0308 |
| 2022/0003957 A1* | 1/2022 | Brown | G02B 7/003 |

FOREIGN PATENT DOCUMENTS

JP        2007159222 A   *   6/2007

OTHER PUBLICATIONS

English Translation JP-2007159222-A (Year: 2007).*

* cited by examiner

*Primary Examiner* — Shafiq Mian
(74) *Attorney, Agent, or Firm* — Muncy, Geissler, Olds & Lowe, P.C.

(57) ABSTRACT

A driving mechanism is provided in the present disclosure, including a fixed portion, a first movable portion, and a first driving assembly. The first movable portion moves relative to the fixed portion in a first direction. The first driving assembly drives the first movable portion to move relative to the fixed portion in the first direction. The first driving assembly includes a coil and a magnetic element corresponding to the coil.

19 Claims, 11 Drawing Sheets

DRIVING MECHANISM

CROSS REFERENCE TO RELATED APPLICATIONS

This application claims the benefit of U.S. Provisional Application No. 63/286,823, filed Dec. 7, 2021, the entirety of which is incorporated by reference herein.

BACKGROUND OF THE INVENTION

Field of the Invention

The present disclosure relates to a driving mechanism, and more particularly to a driving mechanism that includes different driving sources.

Description of the Related Art

In conventional driving mechanisms that only utilize shape memory alloy (SMA), the compression of the shape memory alloy brings the resilient elements connected to the movable portion to deform, so that the movable portion moves back and forth in two opposite directions reciprocally. However, the moving direction of the object cannot be efficiently ensured only by compressing the shape memory alloy. Therefore, in conventional driving mechanisms, multiple preloaded resilient elements are usually disposed as an indication of the moving direction of the movable portion. Furthermore, to balance the mechanism, a pair of resilient elements are usually required for one moving direction. For example, for a rectangular driving mechanism, resilient elements that are preloaded upward are disposed on two sides, while resilient elements that are preloaded downward are disposed on the other two sides. This design takes up a significant amount of space. Therefore, it is important to decrease the required number of resilient elements and still achieve different moving directions.

BRIEF SUMMARY OF THE INVENTION

A driving mechanism is provided in the present disclosure, including a fixed portion, a first movable portion, and a first driving assembly. The first movable portion moves relative to the fixed portion in a first direction. The first driving assembly drives the first movable portion to move relative to the fixed portion in the first direction. The first driving assembly includes a coil and a magnetic element corresponding to the coil.

In some embodiments of the present disclosure, the driving mechanism further includes a second movable portion, a second driving assembly, and a plurality of resilient elements. The second movable portion moves relative to the fixed portion in a second direction. The second driving assembly drives the second movable portion to move relative to the fixed portion in the second direction, wherein the second direction is perpendicular to the first direction. Each of the resilient elements has one end connected to the first movable portion and another end connected to the second movable portion. Parts of the resilient elements are disposed on a first side of the first movable portion in the second direction, and the other parts of the resilient elements are disposed on a second side of the first movable portion in the second direction. The number on the first side is the same as the number on the second side.

In some embodiments of the present disclosure, the second movable portion includes a first movable base and a second movable base. The first movable base is disposed on the first side of the first movable portion, and connected to the first movable portion via one or more of said resilient elements. The second movable base is disposed on the second side of the first movable portion, and connected to the first movable portion via one or more of said resilient elements. The first movable base and the second movable base are disposed symmetrically about a central axis of the first movable portion.

In some embodiments of the present disclosure, the fixed portion includes a bottom and a guiding assembly. The bottom includes a concave portion, wherein the position of the concave portion corresponds to the position of the first movable portion. The guiding assembly is disposed on the bottom, corresponding to the second movable portion and guiding the movable portion to move in the second direction.

In some embodiments of the present disclosure, the guiding assembly includes a plurality of guiding portions and a plurality of limiting portions. The plurality of guiding portions respectively corresponds to the first movable base and the second movable base, limiting the movement of the first movable base and the second movable base in the first direction. The plurality of limiting portions are respectively connected to the guiding portions, limiting the movement of the first movable base and the second movable base in a third direction that is perpendicular to the first direction and to the second direction.

In some embodiments of the present disclosure, the coil of the first driving assembly is disposed on the first movable portion, and the magnetic element is disposed inside the concave portion. The length of the coil is smaller than the length of the magnetic element in the first direction.

In some embodiments of the present disclosure, the coil includes a first outlet and a second outlet. The first outlet is disposed on the first side of the first movable portion, electrically connected to one of the resilient elements that is located on the first side. The second outlet is disposed on the second side of the first movable portion, electrically connected to one of the resilient elements that is located on the second side. The first outlet and the second outlet do not overlap when viewed in the first direction, the second direction, and the third direction.

In some embodiments of the present disclosure, the coil of the first driving assembly is disposed inside the concave portion, and the magnetic element is embedded in the first movable portion. The length of the magnetic element is smaller than the length of the coil in the first direction.

In some embodiments of the present disclosure, the height of the resilient element is smaller than the height of the guiding portions in the third direction.

In some embodiments of the present disclosure, the height of the second driving assembly is smaller than the height of the guiding portions in the third direction.

In some embodiments of the present disclosure, the first movable portion has a first terminal position and a second terminal position in the first direction relative to an initial position of the first movable portion. The distance between the first terminal position and the second terminal position in the first direction is longer than the maximum length of the concave portion in the first direction.

In some embodiments of the present disclosure, the distance between the first terminal position and the second terminal position in the first direction is longer than the maximum length of the first driving assembly in the first direction.

In some embodiments of the present disclosure, when the first movable portion is in the initial position, the first movable portion is driven by the first driving assembly to move toward the first terminal position or toward the second terminal position. Then the second movable portion is driven by the second driving assembly, so that the resilient elements that connect the first movable portion and the second movable portion deform. The deformation of the resilient elements brings the first movable portion to continue moving toward the first terminal position or toward the second terminal position, until the first movable portion reaches the first terminal position or the second terminal position.

In some embodiments of the present disclosure, when the first movable portion is in the first terminal position or the second terminal position, the first movable portion returns to the initial position via the resilient restoring force of the resilient elements and the driving force of the first driving assembly.

In some embodiments of the present disclosure, the second movable portion further includes a first extension portion, a first conductive portion, a second extension portion, and a second conductive portion. The first extension portion is connected to the first movable base. The first conductive portion is partially disposed on the first extension portion and partially embedded in the first movable base. The second extension portion is connected to the second movable base. The second conductive portion is partially disposed on the second extension portion and partially embedded in the second movable base.

In some embodiments of the present disclosure, in the first direction, the length of the first extension portion is longer than the length of the first movable base. In the first direction, the length of the second extension portion is longer than the length of the second movable base.

In some embodiments of the present disclosure, the first conductive portion has a first clamping structure that is electrically connected to the second driving assembly. The second conductive portion has a second clamping structure that is electrically connected to the second driving assembly.

In some embodiments of the present disclosure, the first movable base, the first extension portion, and the first conductive portion are formed integrally. The second movable base, the second extension portion, and the second conductive portion are formed integrally.

In some embodiments of the present disclosure, the second driving assembly includes a plurality of driving elements. The plurality of driving elements includes shape memory alloy. Each of the driving elements has a line structure, having one end that is electrically connected to the first conductive portion and another end that is electrically connected to the second conductive portion.

In some embodiments of the present disclosure, parts of the driving elements are disposed on a third side of the first movable portion in the first direction, and the other parts of the driving elements are disposed on a fourth side of the first movable portion in the first direction. The number on the third side is the same as the number on the fourth side.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
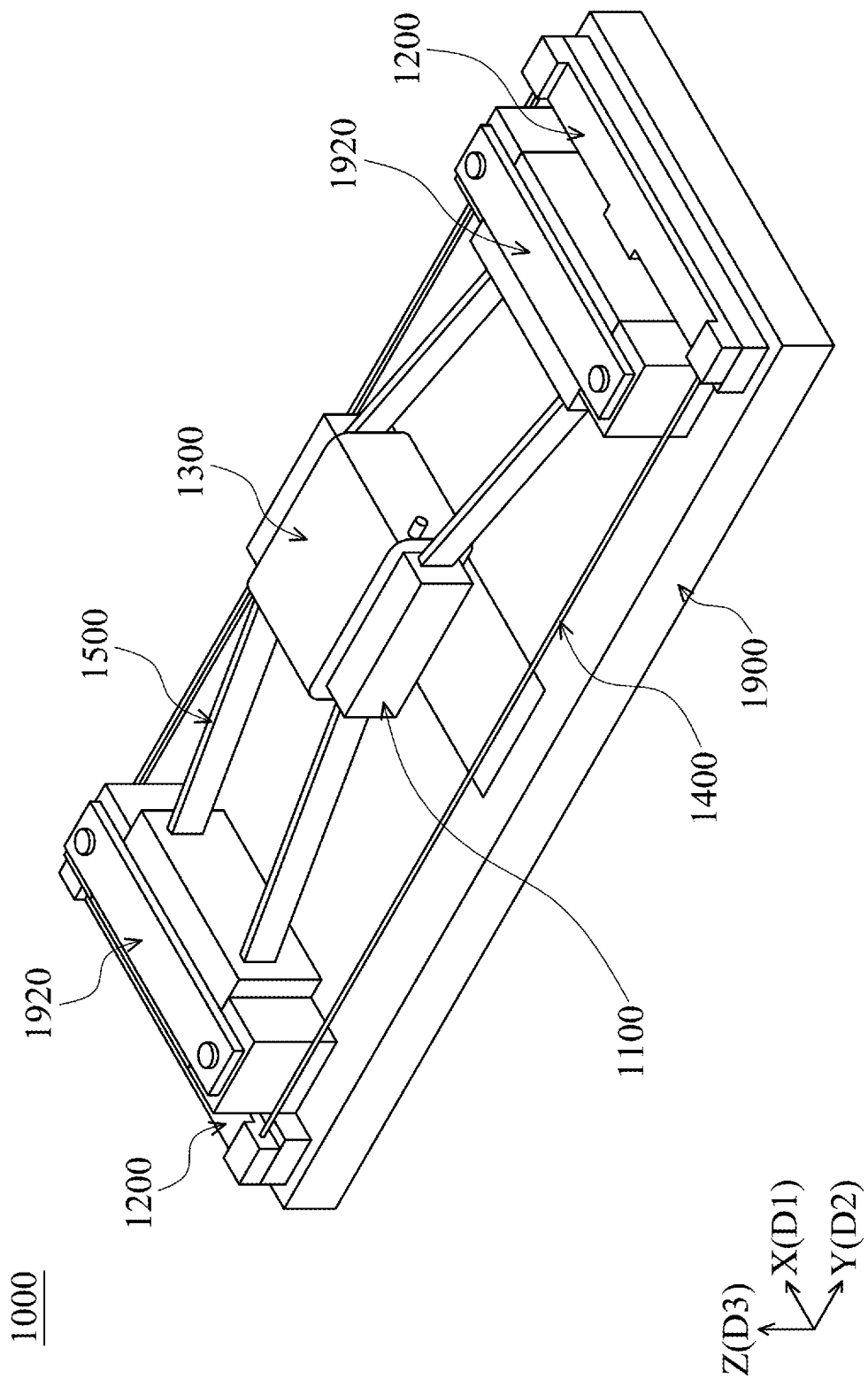
FIG. 1 is a perspective view of the driving mechanism, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Firstly, referring to FIG. 1, FIG. 1 is a perspective view of the driving mechanism 1000, according to some embodiments of the present disclosure. As shown in FIG. 1, the driving mechanism 1000 mainly includes a first movable portion 1100, a second movable portion 1200, a first driving assembly 1300, a second driving assembly 1400, a plurality of resilient elements 1500 and a fixed portion 1900.

The first movable portion 1100 moves in a first direction D1 relative to the fixed portion 1900. The second movable portion 1200 moves in a second direction D2 relative to the fixed portion 1900. The first driving assembly 1300 is partially connected to the first movable portion 1100 and partially connected to the fixed portion 1900, for driving the first movable portion 1100 to move in the first direction D1 relative to the fixed portion 1900. The second driving assembly 1400 is connected to the second movable portion 1200, for driving the second movable portion 1200 to move in the second direction D2 relative to the fixed portion 1900. Each of the resilient elements 1500 is connected to the first movable portion 1100 and to the second movable portion 1200. In some embodiments according to the present disclosure, while the second driving assembly 1400 drives the second movable portion 1200 to move in the second direction D2, the deformation of the resilient elements 1500 that connect the first movable portion 1100 and the second movable portion 1200 brings the first movable portion 1100 to move in the first direction D1. In some embodiments, the first direction D1 is perpendicular to the second direction D2.

Figure 2:
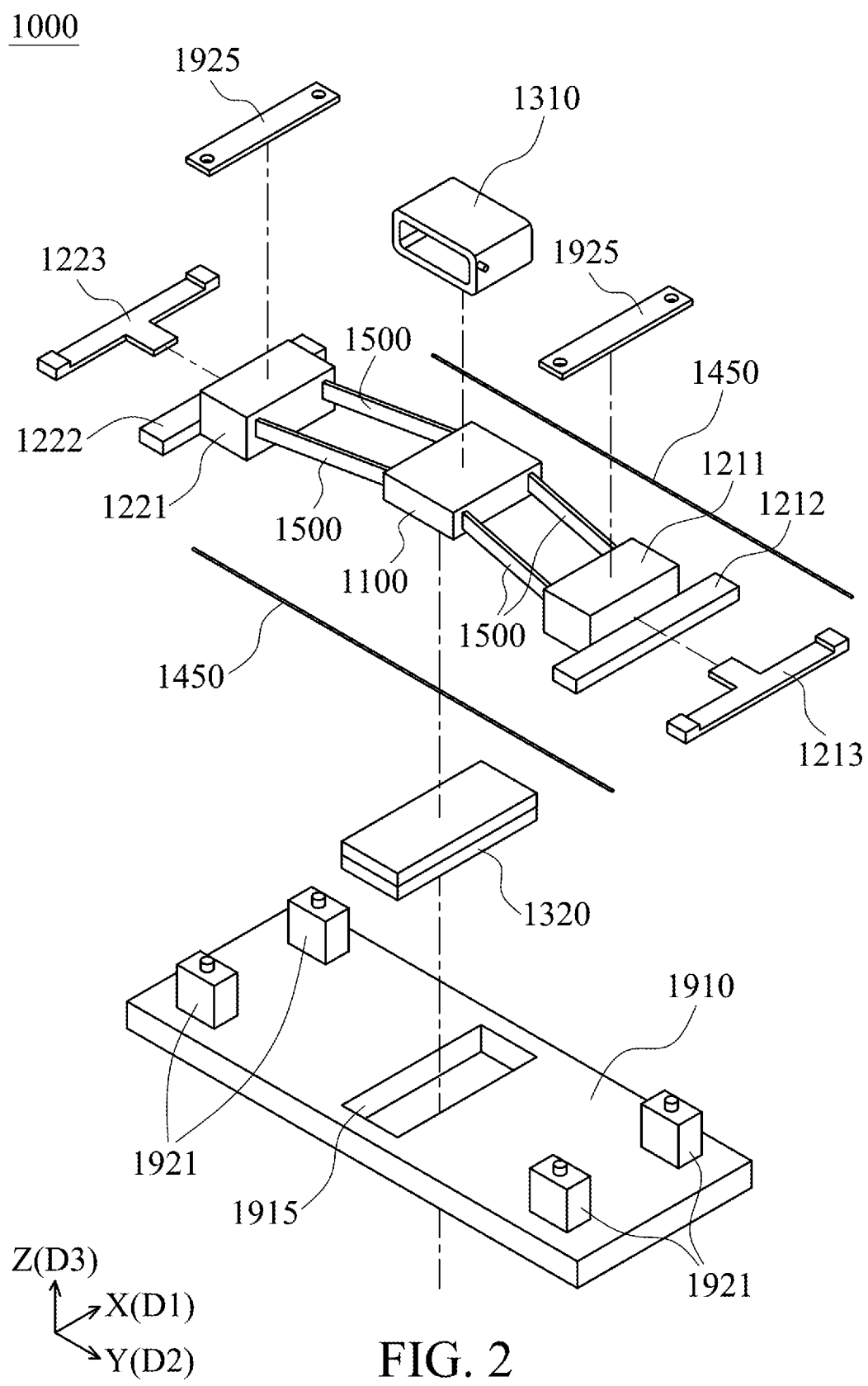
FIG. 2 is an exploded view of the driving mechanism, according to some embodiments of the present disclosure.
Figure 3:
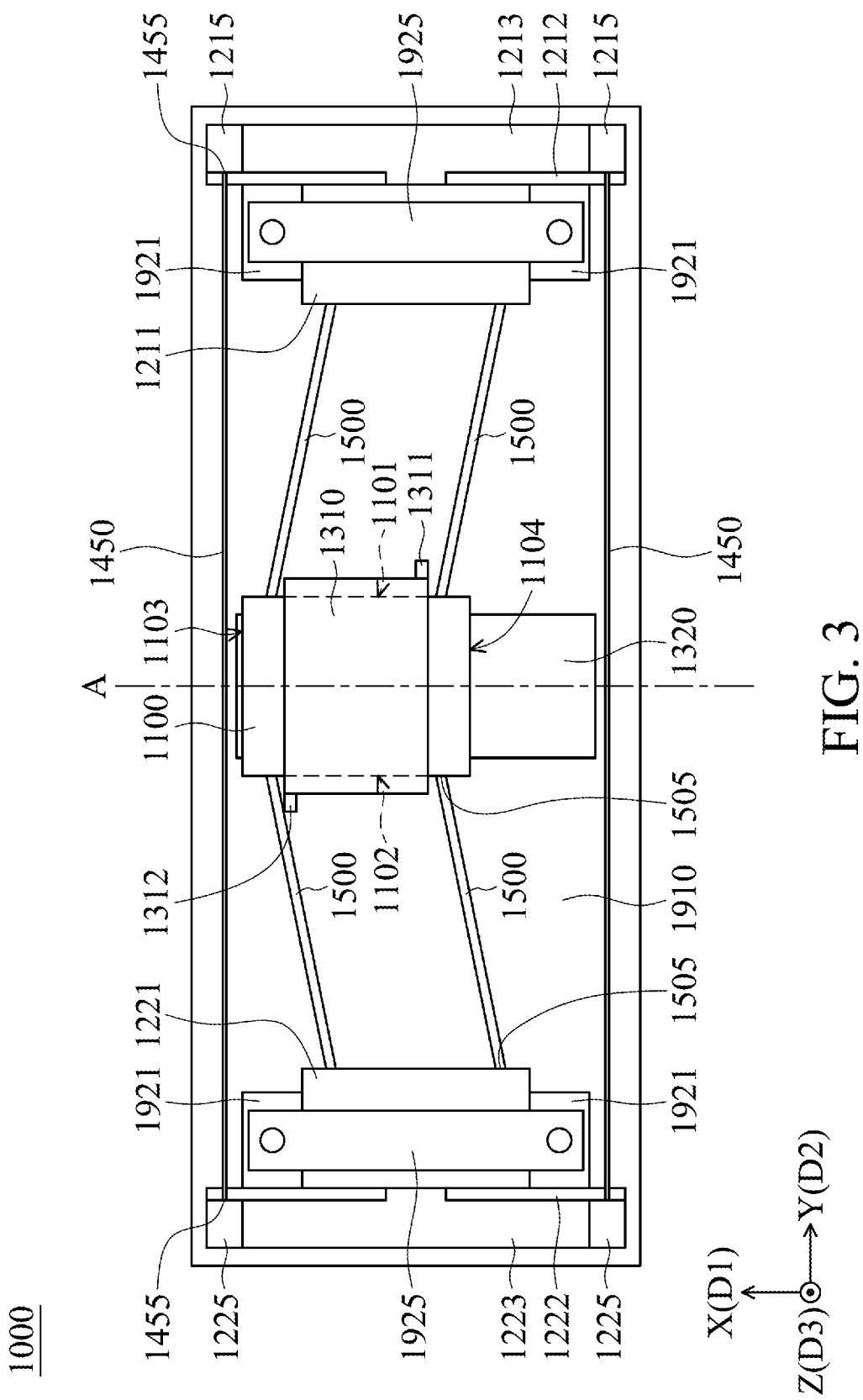
FIG. 3 is a top view of the driving mechanism, according to some embodiments of the present disclosure.

Referring to FIG. 2 and FIG. 3, FIG. 2 is an exploded view of the driving mechanism 1000, according to some embodiments of the present disclosure. FIG. 3 is a top view of the driving mechanism 1000, according to some embodiments of the present disclosure. As shown in FIG. 3, the first movable portion 1100 is substantially located at the center of the entire driving mechanism 1000, having a central axis A. In the present embodiment, the extending direction of the central axis A is parallel to the first direction D1. Although the first movable portion 1100 is illustrated as a substantially rectangular element in the present figures, the first movable portion 1100 may be any object that needs to be moved, which may have any suitable shapes.

The second movable portion 1200 may include a first movable base 1211 and a second movable base 1221. The first movable base 1211 and the second movable base 1221 may be respectively connected to the first movable portion 1100 via one or more resilient elements 1500. As shown in FIG. 3, the first movable base 1211 may be disposed on the first side 1101 of the first movable portion 1100 in the second direction D2, and the second movable base 1221 may be disposed on the second side 1102 of the first movable portion 1100 in the second direction D2. The first movable base 1211 and the second movable base 1221 are disposed symmetrically about the central axis A of the first movable portion 1100.

In some embodiments according to the present disclosure, the fixed portion 1900 may include a bottom 1910 and a guiding assembly 1920. The guiding assembly 1920 is fixedly disposed on the bottom 1910, corresponding to the second movable portion 1200 and guiding the second movable portion 1200 to move in the second direction D2. Specifically, the guiding assembly 1920 includes a plurality of guiding portions 1921 and a plurality of limiting portions 1925.

Figure 7:
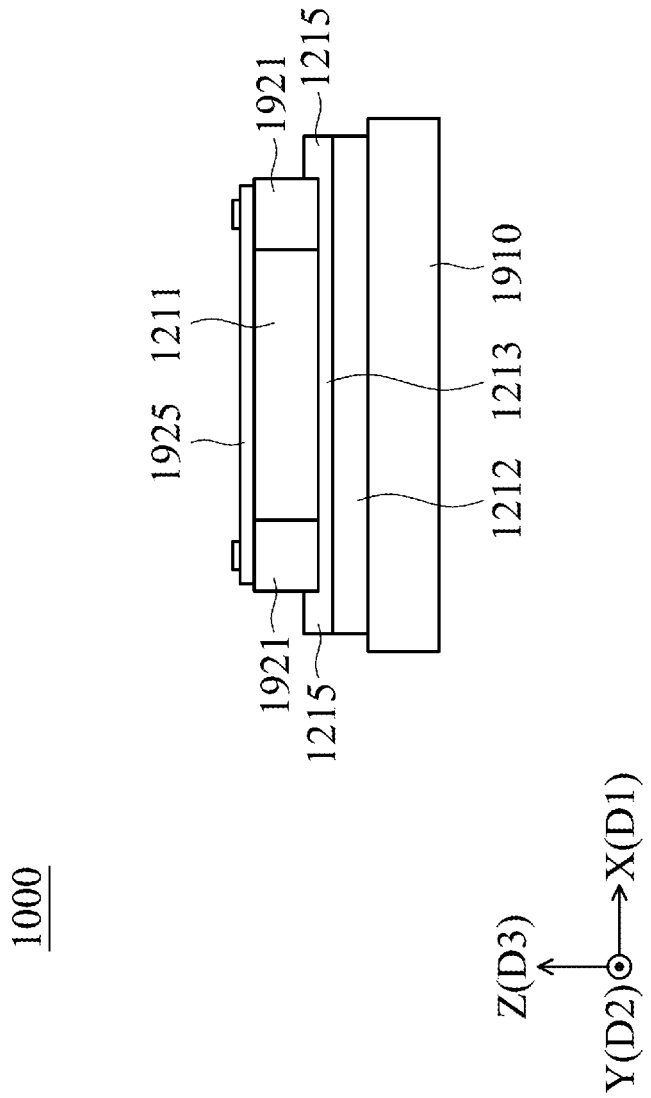
FIG. 7 is a side view of the driving mechanism, according to some embodiments of the present disclosure.

Referring to FIG. 2, FIG. 3, and FIG. 7, FIG. 7 is a side view of the driving mechanism 1000, according to some embodiments of the present disclosure. The guiding portion 1921 may be composed of multiple (e.g. four) block-shaped structures that protrude from the bottom 1910, which are divided into two groups, located on the first side 1101 and the second side 1102 of the first movable portion 1100, respectively. Each group of the guiding portions 1921 includes two blocks that are arranged along the first direction D1. The two blocks are respectively located on opposite sides of the first movable base 1211 (or the second movable base 1221) in the first direction D1. Additionally, the distance between the blocks that are on two sides of the first movable base 1211 (or the second movable base 1221) is substantially equal to the width of the first movable base 1211 (or the second movable base 1221) in the first direction D1. In this way, the guiding portions 1921 may limit the movement of the first movable base 1211 and the second movable base 1221 in the first direction D1.

The limiting portions 1925 may be composed of multiple (e.g. two) board-shaped structures that are disposed above the top surfaces of the guiding portions 1921 (in Z direction). In some embodiments, each block of the guiding portions 1921 may include a protrusion on its top surface. The protrusion corresponds to an opening on each limiting portion 1925. By engaging the protrusions of the guiding portions 1921 and the openings of the limiting portions 1925, the guiding portions 1921 and the limiting portions 1925 may be secured together. In some embodiments according to the present disclosure, each of the limiting portions 1925 corresponds to two guiding portions 1921, connecting the two guiding portions 1921. Additionally, as shown in FIG. 7, in the third direction D3 that is perpendicular to the first direction D1 and to the second direction D2, the bottom surface of the limiting portion 1925 may be in contact with the top surfaces of the first movable base 1211 (or the second movable base 1221), so that the limiting portions 1925 may limit the movement of the first movable base 1211 and the second movable base 1221 in the third direction D3.

Therefore, through the guiding portions 1921 and the limiting portions 1925 of the guiding assembly 1920, the guiding assembly 1920 may limit the movement of the 1220 in the first direction D1 and in the third direction D3, so that the second movable portion 1200 is guided to move in the second direction D2.

In some embodiments, the second movable portion 1200 may further include a first extension portion 1212 and a second extension portion 1222. The first extension portion 1212 is connected to the first movable base 1211, and the second extension portion 1222 is connected to the second movable base 1221. In some embodiments, in the first direction D1, the length of the first extension portion 1212 is greater than the length of the first movable base 1211, and the length of the second extension portion 1222 is greater than the length of the second movable base 1221. Take the first extension portion 1212 for example, the first extension portion 1212 is farther away from the central axis A than the first movable base 1211. When the second movable portion 1200 moves in the second direction D2, the surface of the first extension portion 1212 that faces the central axis A may contact the guiding portion(s) 1921 for limitation purposes. This improves stability of the mechanism. Similarly, the second extension portion 1222 is farther away from the central axis A than the second movable base 1221. When the second movable portion 1200 moves in the second direction D2, the surface of the second extension portion 1222 that faces the central axis A may contact the guiding portion(s) 1921. That is, as shown in FIG. 3 and FIG. 7, parts of the second movable portion 1200 (e.g. the first movable base 1211 and the second movable base 1221) is located inside a space that is formed by the guiding portions 1921 and the limiting portions 1925, and the other parts (e.g. the first extension portion 1212 and the second extension portion 1222) are located outside the space. The guiding assembly 1920 defines the moving range of the second movable portion 1200. This is helpful for improving the overall stability.

As shown in FIG. 2 and FIG. 3, the bottom 1910 of the fixed portion 1900 may have a concave portion 1915. The location of the concave portion 1915 may correspond to the first movable portion 1100. For example, the concave portion 1915 is located right beneath the first movable portion 1100. In some embodiments, the first driving assembly 1300 includes a coil 1310 and a magnetic element 1320 corresponding to the coil 1310. In the embodiment shown in FIG. 2, the coil 1310 is disposed on the first movable portion 1100, and the magnetic element 1320 is disposed inside the concave portion 1915 of the fixed portion 1900. Through the electromagnetic driving force generated by the coil 1310 and the magnetic element 1320, the first driving assembly 1300 drives the first movable portion 1100 to move relative to the fixed portion 1900. In the embodiment shown in FIG. 2, the magnetic element 1320 has a substantially rectangular shape, whose longer side extend in a direction that is parallel to the moving direction of the first movable portion 1100 (i.e. the first direction DD. Additionally, the shape of the concave portion 1915 substantially corresponds to the shape of the magnetic element 1320. In some embodiments, in the first direction D1, the length of the coil 1310 is smaller than the length of the magnetic element 1320. In some embodiments, in the first direction D1, the length of the coil 1310 is also smaller than the length of the first movable portion 1100, so that there is enough space on the first movable portion 1100 for connecting the resilient elements 1500.

In the embodiments shown in FIG. 2 and FIG. 3, the driving mechanism 1000 includes four resilient elements 1500. The resilient elements 1500 may be deformable resilient sheets, or include any suitable structures or shapes. As shown in FIG. 3, each of the resilient elements 1500 has one end 1505 that is connected to the first movable portion 1100 and another end 1505 that is connected to the second movable portion 1200 (e.g. the first movable base 1211 or the second movable base 1221). Parts of the resilient element 1500 (e.g. two out of the four) are disposed on the first side 1101 of the first movable portion 1100, and the other parts of the resilient element 1500 (e.g. the other two out of the four) are disposed on the second side 1102 of the first movable portion 1100. It should be noted that, for the balance of the first movable portion 1100, the number of resilient elements 1500 on the first side 1101 is the same as the number on the second side 1102. Additionally, the number of resilient elements 1500 is not limited to the number illustrated in the present disclosure. In some other embodiments, the driving mechanism 1000 may include more or less than four resilient elements 1500.

Figure 6:
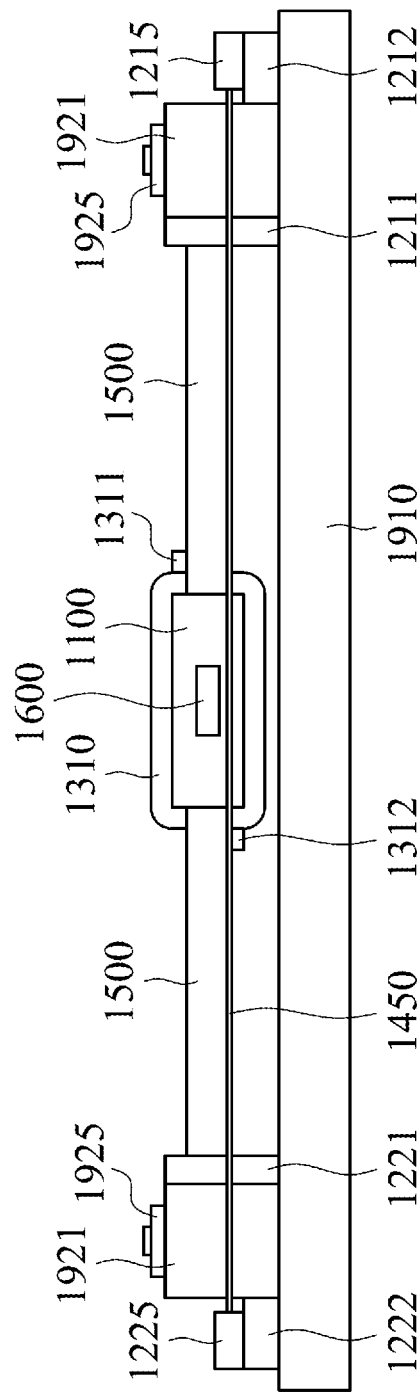
FIG. 6 is a front view of the driving mechanism, according to some embodiments of the present disclosure.

In the embodiment shown in FIG. 3, the coil 1310 includes a first outlet 1311 and a second outlet 1312. Referring to FIG. 3 and FIG. 6, FIG. 6 is a front view of the driving mechanism 1000, according to some embodiments of the present disclosure. The first outlet 1311 is disposed on the first side 1101 of the first movable portion 1100, and is electrically connected to one of the resilient elements 1500 that is located on the first side 1101. For example, the first outlet 1311 may be connected to the resilient element 1500 on the first side 1101 that is closer to —X direction. The second outlet 1312 is located on the second side 1102 of the first movable portion 1100, and is electrically connected to one of the resilient elements 1500 that is located on the second side 1102. For example, the second outlet 1312 may be connected to the resilient element 1500 on the second side 1102 that is closer to +X direction. Additionally, as shown in FIG. 6, the first outlet 1311 may be closer to +Z direction, and the second outlet 1312 may be closer to −Z direction. As such, the first outlet 1311 and the second outlet 1312 do not overlap when viewed in the first direction D1, the second direction D2, and the third direction D3.

In some embodiments, the electrical connection between the first outlet 1311 and the second outlet 1312 and the resilient elements 1500 may be through welding or any suitable method. In such embodiments, the resilient elements 1500 may be further electrically connected to a circuit structure (not shown) that is disposed inside the second movable portion 1200, so that signals (e.g. control signals) from external sources may be transmitted to the coil 1310 via the circuit structure and the resilient elements 1500. These signals are used to control the current direction of the coil 1310, which determines the moving direction (e.g. in +X or −X direction) of the coil 1310 (and therefore the first movable portion 1100).

The second driving assembly 1400 may include a plurality of driving elements 1450. In the embodiments shown in FIG. 2 and FIG. 3, the second driving assembly 1400 includes two driving elements 1450. Each of the driving elements 1450 may have a line structure, extending along the second direction D2, and connected to the second movable portion 1200. In some embodiments, the driving elements 1450 may include shape memory alloy (SMA). When electric current passes through the driving elements 1450, the driving elements 1450 deform (e.g. compression) and bring the second movable portion 1200 to move. As shown in FIG. 3, parts of the driving elements 1450 (e.g. one out of the two) are disposed on the third side 1103 of the first movable portion 1100 in the first direction D1, and the other parts of the driving elements 1450 (e.g. the other one out of the two) are disposed on the fourth side 1104 of the first movable portion 1100 in the first direction D1. It should be noted that, for keeping the second movable portion 1200 in balance, the number of driving elements 1450 on the third side 1103 is the same as the number on the fourth side 1104.

In addition, in some embodiments according to the present disclosure, the entire driving element 1450 extends in parallel to the second direction D2 without any bending. This feature is advantageous for concentrating the driving forces provided by the driving element 1450, so that the compressed deformation generated by the shape memory alloy may be entirely converted to the stroke of the second movable portion 1200.

Figure 5:
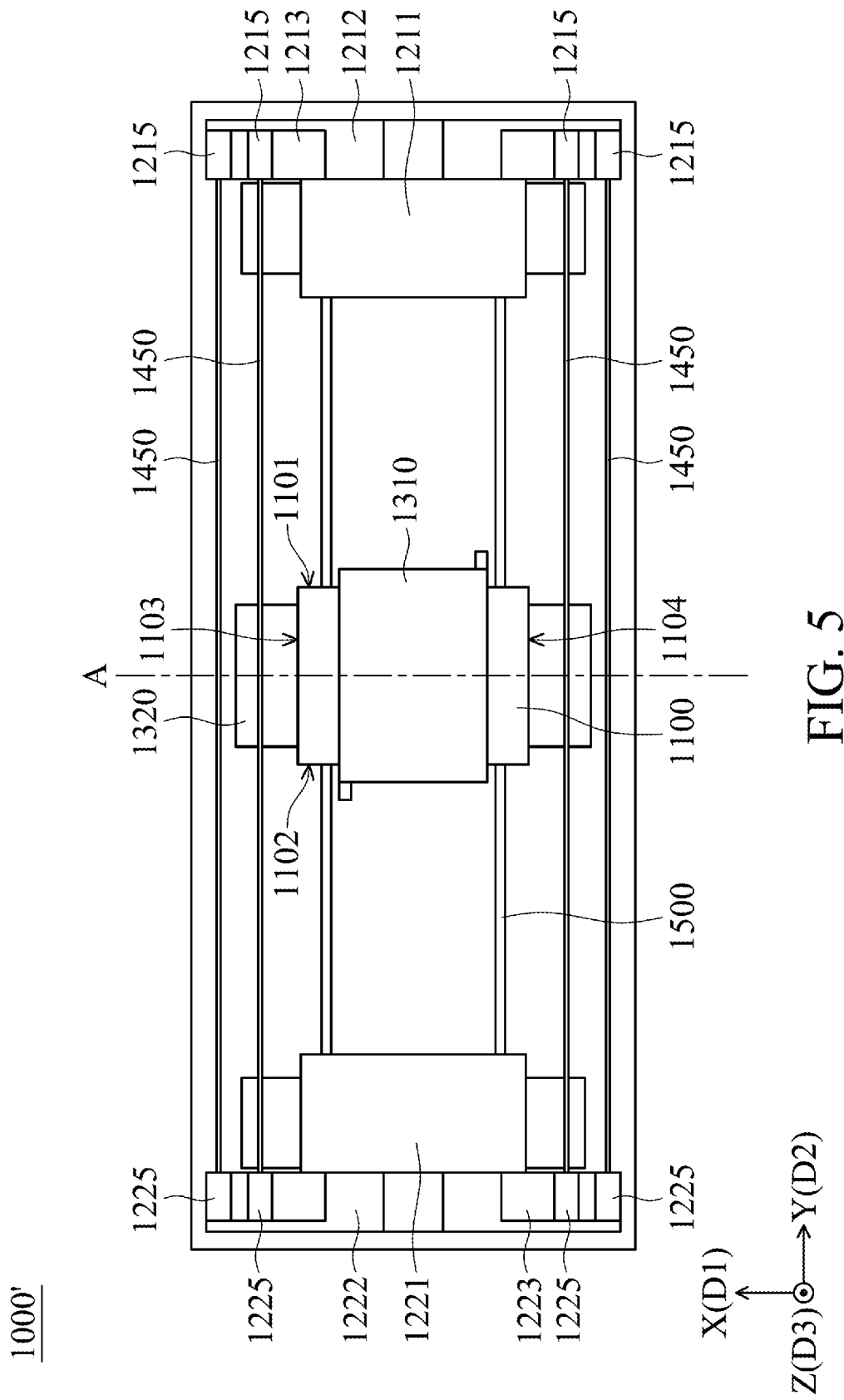
FIG. 5 is a top view of the driving mechanism, according to other embodiments of the present disclosure.

Referring to FIG. 5, FIG. 5 is a top view of the driving mechanism 1000', according to other embodiments of the present disclosure. The driving mechanism 1000' shown in FIG. 5 is similar to the driving mechanism 1000 shown in FIG. 3. The difference between them is that the driving mechanism 1000' includes four driving elements 1450. As mentioned above, the number of driving elements 1450 on the third side 1103 is the same as the number on the fourth side 1104. Therefore, in FIG. 5, two out of the four driving elements 1450 are disposed on the third side 1103, and the other two driving elements 1450 are disposed on the fourth side 1104. It should be noted that the number of driving elements 1450 is not limited to the number illustrated in the present disclosure. For example, if the first movable portion 1100 is heavier, it would need a greater driving force, and so the user may increase the number of driving elements 1450 to meet these requirements. In some embodiments, as shown in FIG. 3, when viewed along the third direction D3, the driving elements 1450 do not overlap the first driving assembly 1300 for preventing undesirable magnetic interference. In some embodiments, as shown in FIG. 5, parts of the driving elements 1450 may overlap the first driving assembly 1300 for miniaturization purposes.

Referring to FIG. 2, FIG. 3, and FIG. 5, the second movable portion 1200 may further include a first conductive portion 1213 and a second conductive portion 1223. The first conductive portion 1213 may be partially disposed on the first extension portion 1212, and may be partially embedded in the first movable base 1211. Specifically, the first conductive portion 1213 may have a T-shaped structure (see FIG. 2), wherein the bar-shaped portion is disposed on the first extension portion 1212, and the portion that extends from the center of the bar-shaped portion is embedded in the first movable base 1211 (see FIG. 3). Similarly, the second conductive portion 1223 may be partially disposed on the second extension portion 1222, and may be partially embedded in the second movable base 1221. In some embodiments, the first movable base 1211, the first extension portion 1212, and the first conductive portion 1213 are formed integrally, such as, by insert molding process or the like. Similarly, in some embodiments, the second movable base 1221, the second extension portion 1222, and the second conductive portion 1223 are formed integrally.

In some embodiments, the first conductive portion 1213 may have a plurality of first clamping structures 1215, each of which corresponds to one driving element 1450. Similarly, the second conductive portion 1223 may have a plurality of second clamping structures 1225, each of which also corresponds to one driving element 1450. As shown in FIG. 3 and FIG. 5, each of the driving elements 1450 may include one end 1455 that is electrically connected to the first conductive portion 1213 and another end 1455 that is electrically connected to the second conductive portion 1223. Specifically, each of the driving elements 1450 may be secured (e.g. held or welded, etc.) at the first clamping structures 1215 and the second clamping structures 1225, thereby electrically connecting the first conductive portion 1213 and the second conductive portion 1223. The number of first clamping structures 1215 and the second clamping structures 1225 correspond to the number of driving elements 1450. Therefore, in the embodiment shown in FIG. 3, the first conductive portion 1213 and the second conductive portion 1223 each includes two first clamping structures 1215/second clamping structures 1225. In the embodiment shown in FIG. 5, the first conductive portion 1213 and the second conductive portion 1223 each includes four first clamping structures 1215/second clamping structures 1225. However, the number of first clamping structures 1215 and second clamping structures 1225 are not limited thereto.

In some embodiments, as shown in FIG. 5, the first conductive portion 1213 and the second conductive portion 1223 may each include multiple electrically isolated portions, such as a first portion on two ends in the first direction D1 and a second portion at the midpoint in the first direction D1, wherein the first portion and the second portion are electrically isolated. The first portion may be electrically connected to the driving elements 1450 for transmitting driving signals to the second driving assembly 1400. The second portion may be electrically connected to the resilient elements 1500 that is connected to the first movable base 1211 or to the second movable base 1221. Since the resilient element 1500 is electrically connected to the coil 1310, the second portion may transmit driving signals to the first driving assembly 1300. As such, the driving signals for the first driving assembly 1300 and the second driving assembly 1400 may be prevented from interfering each other. This improves stability.

Referring to FIG. 6 again, in some embodiments, the height of the resilient elements 1500 and the height of the second driving assembly 1400 (including a plurality of driving elements 1450) in the third direction D3 are both smaller than the height of the guiding portions 1921 in the third direction D3 when viewed along the first direction D1. Additionally, in the embodiments where the third side 1103 and the fourth side 1104 of the first movable portion 1100 each includes multiple driving elements 1450, each driving element 1450 may have the same height in the third direction D3.

Figure 4A:
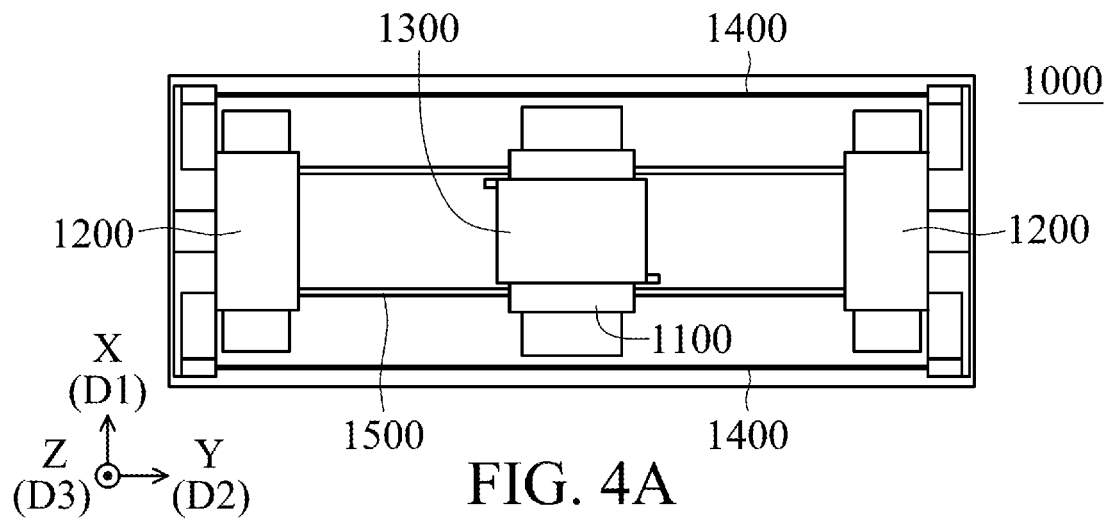
FIG. 4A to FIG. 4C respectively show schematic views of the first movable portion of the driving mechanism in different positions during moving process, according to some embodiments of the present disclosure.
Figure 4B:
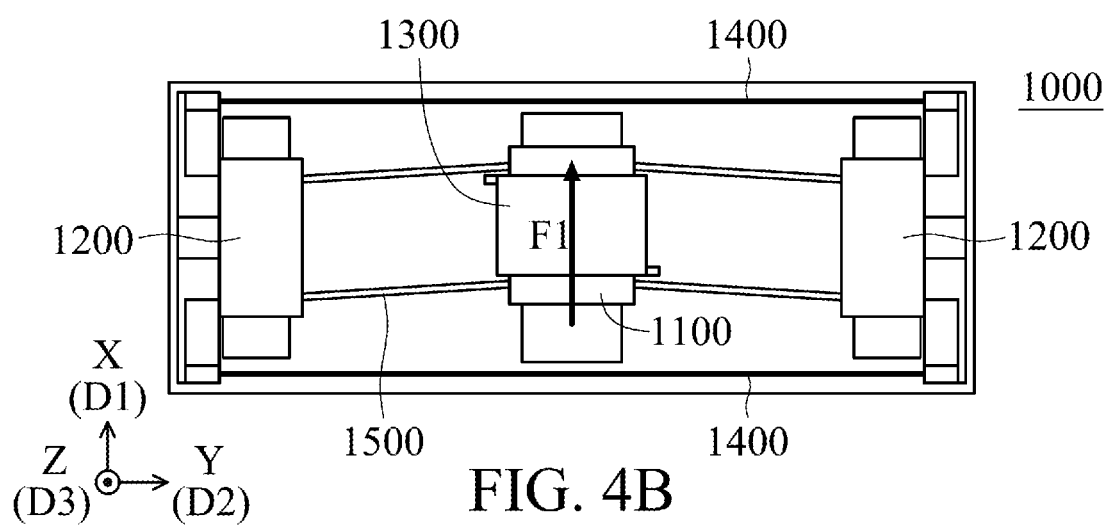
Figure 4C:
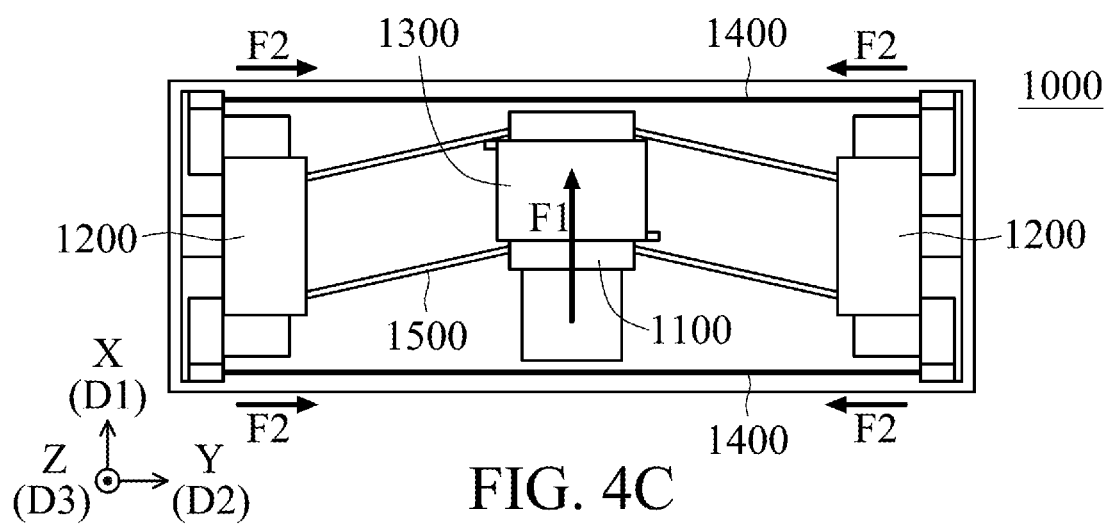

Referring to FIG. 4A to FIG. 4C, FIG. 4A to FIG. 4C respectively show schematic views of the first movable portion 1100 in different positions during moving process, according to some embodiments of the present disclosure.

In FIG. 4A, the first movable portion 1100 is located in an initial position. In some embodiments, the initial position of the first movable portion 1100 is set to the midpoint of the entire stroke that the first movable portion 1100 moves in the first direction D1. As shown in FIG. 4A, in the initial position, the resilient elements 1500 are substantially parallel to the second direction D2, i.e., perpendicular to the moving direction of the first movable portion 1100 (the first direction D1). In the embodiments of the present disclosure, the terminal position that the first movable portion 1100 reaches when moving along +X direction (the first direction D1) is referred to as the first terminal position, and the terminal position that the first movable portion 1100 reaches when moving along −X direction (the first direction D1) is referred to as the second terminal position. In some embodiments, the distance between the first terminal position and the second terminal position in the first direction D1 is longer than the maximum length of the concave portion 1915 of the bottom 1910 in the first direction D1. In some embodiments, the distance between the first terminal position and the second terminal position in the first direction D1 is longer than the maximum length of the first driving assembly 1300 (including the coil 1310 and the magnetic element 1320) in the first direction D1. That is, the length of the total stroke of the first movable portion 1100 in the first direction D1 is longer than the maximum length of the first driving assembly 1300 in the first direction D1.

When the first movable portion 1100 is in the initial position as shown in FIG. 4A, it starts by using the first driving assembly 1300 to drive the first movable portion 1100 to move toward the first terminal position or toward the second terminal position. Specifically, by alternating the direction of the electric current that passes through the coil 1310 of the first driving assembly 1300, the first movable portion 1100 may be driven to move toward +X direction or toward −X direction. The first driving assembly 1300 provides a starting force for the first movable portion 1100, which determines the direction of the first movable portion 1100 moving from the initial position.

In FIG. 4B and FIG. 4C, as an exemplary embodiment, the first driving force F1 provided by the first driving assembly 1300 is toward +X direction, which drives the first movable portion 1100 to move toward the first terminal position. It should be noted that, as mentioned above, in some other embodiments, the first driving assembly 1300 may provide a first driving force F1 that is toward −X direction, which drives the first movable portion 1100 to move toward the second terminal position.

As shown in FIG. 4B, after the first movable portion 1100 is driven by the first driving force F1, the resilient elements 1500 that are connected thereto are slightly biased, leaving their initial positions and no longer parallel to the second direction D2. When the resilient elements 1500 deform toward +X direction, it is helpful for the second driving assembly 1400 to continue driving the first movable portion 1100 to move toward +X direction.

As shown in FIG. 4C, the second driving assembly 1400 drives the second movable portion 1200 to move along the second direction D2. Specifically, when the second driving assembly 1400 (e.g. the driving elements 1450 include a shape memory alloy) are powered, the second driving assembly 1400 compresses and provides the second driving force F2, driving the second movable portion 1200 to move along the second direction D2 toward the first movable portion 1100. The second driving assembly 1400 drives the second movable portion 1200 to move, so that the resilient elements 1500 connecting the first movable portion 1100 and the second movable portion 1200 continue to deform. The deformation of the resilient elements 1500 brings the first movable portion 1100 to keep moving toward the first terminal position, until the first movable portion 1100 reaches the first terminal position (as shown in FIG. 4C).

It should be noted that the first driving force F1 not only acts as the driving force that determines the moving direction of the first movable portion 1100, the first driving force F1 may also continue to act while the second driving force F2 is acting. Therefore, the first driving force F1 and the second driving force F2 may act simultaneously to drive the first movable portion 1100 to move. As such, the driving mechanism 1000 provided by the present disclosure is suitable for driving a first movable portion 1100 that is heavier than a typical driving mechanism that only uses coils and magnets to drive the movable portions. Furthermore, in comparison with typical driving mechanisms that only use shape a memory alloy to drive the movable portions, the driving mechanism 1000 provided by the present disclosure allows the second driving force F2 (which acts in the same direction) to drive the first movable portion 1100 to move in different directions (e.g. +X direction and −X direction) by disposing the first driving assembly 1300.

In some embodiments, when the first movable portion 1100 is in the first terminal position or the second terminal position, after the second driving assembly 1400 is no longer powered (i.e. stop providing the second driving force F2), the first movable portion 1100 may return to the initial position via the resilient restoring force of the resilient elements 1500. In some further embodiments, as shown in FIG. 6, the driving mechanism 1000 may further include a sensing element 1600 disposed on the first movable portion 1100 for sensing the positions of the first movable portion 1100. The sensing element 1600 corresponds to a sensor (not shown) that is affixed onto the fixed portion 1900, such as a Hall sensor, etc. In such embodiments, when the first movable portion 1100 is in the first terminal position or the second terminal position, after the second driving assembly 1400 is no longer powered, the first movable portion 1100 may return to the initial position via the resilient restoring force of the resilient elements 1500 and the first driving force F1 of the first driving assembly 1300. Since the sensing element 1600 is included, user may control the first driving assembly 1300 to make sure the first movable portion 1100 returns to its initial position that is at the center. Additionally, in the embodiment shown in FIG. 6, the sensing element 1600 is disposed on the bottom surface of the first movable portion 1100 facing the second driving assembly 1400. However, the location of the sensing element 1600 is not limited thereto. It may be disposed at any suitable location on the first movable portion 1100.

Figure 8:
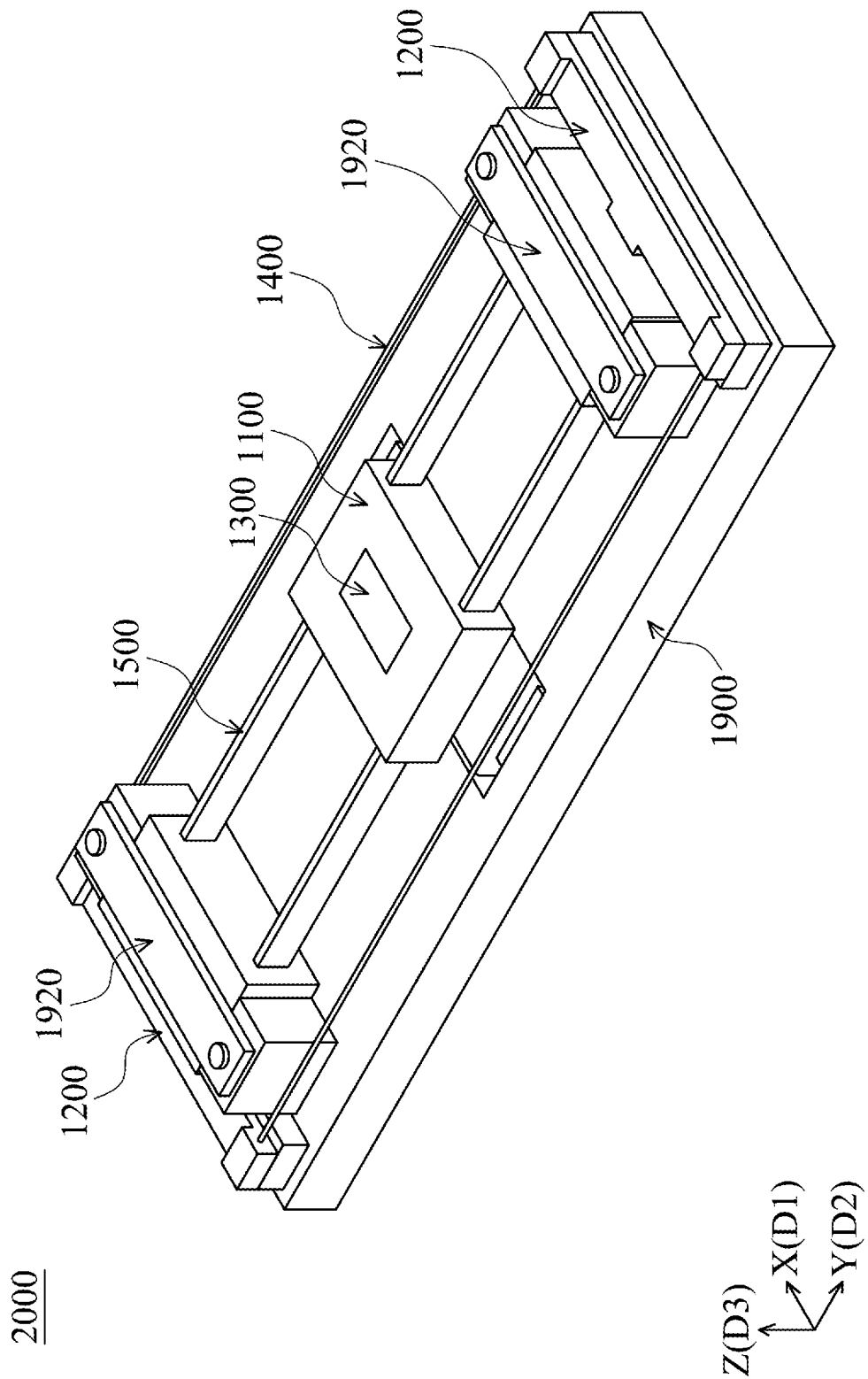
FIG. 8 is a perspective view of the driving mechanism, according to some different embodiments of the present disclosure.
Figure 9:
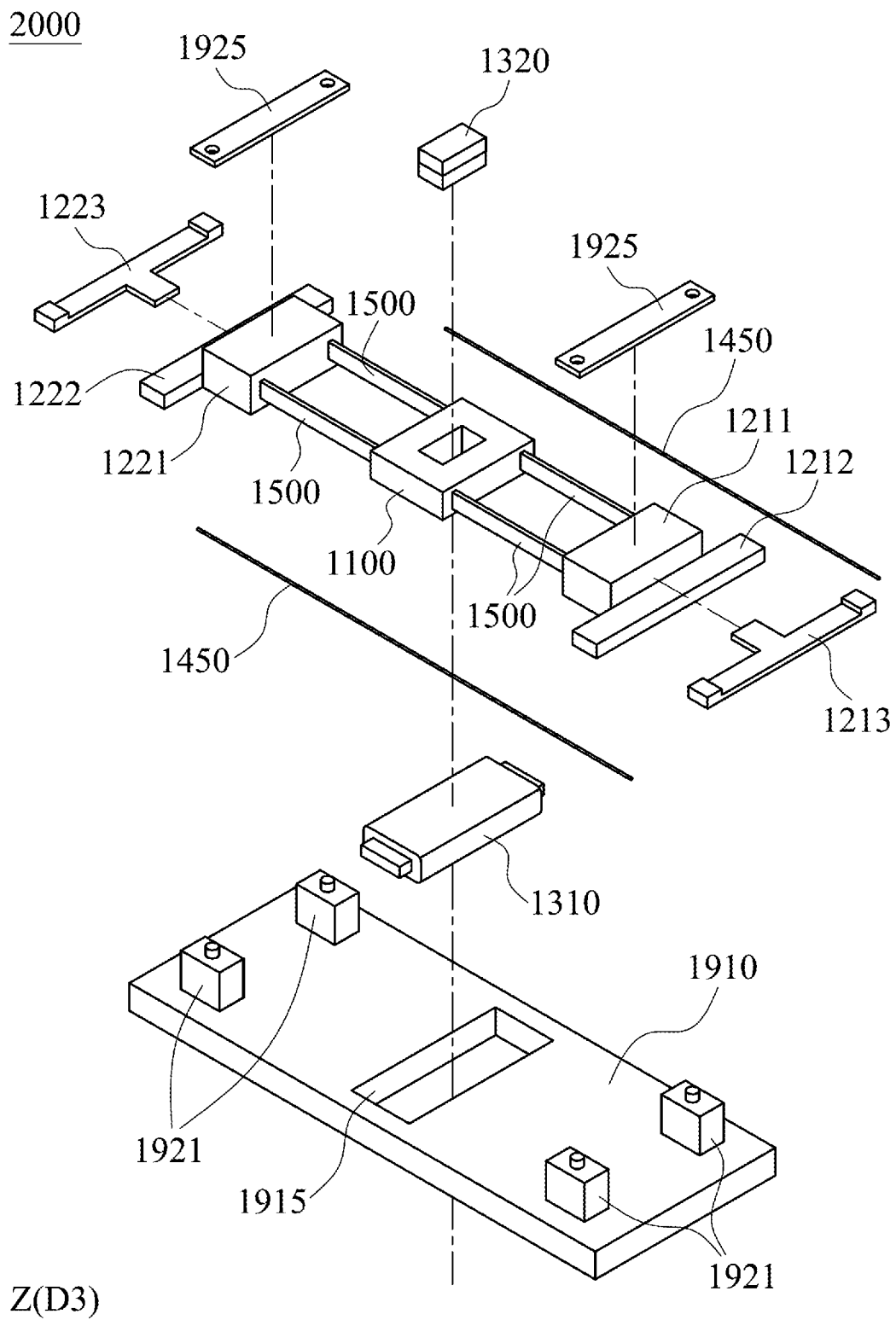
FIG. 9 is an exploded view of the driving mechanism, according to some different embodiments of the present disclosure.
Figure 10:
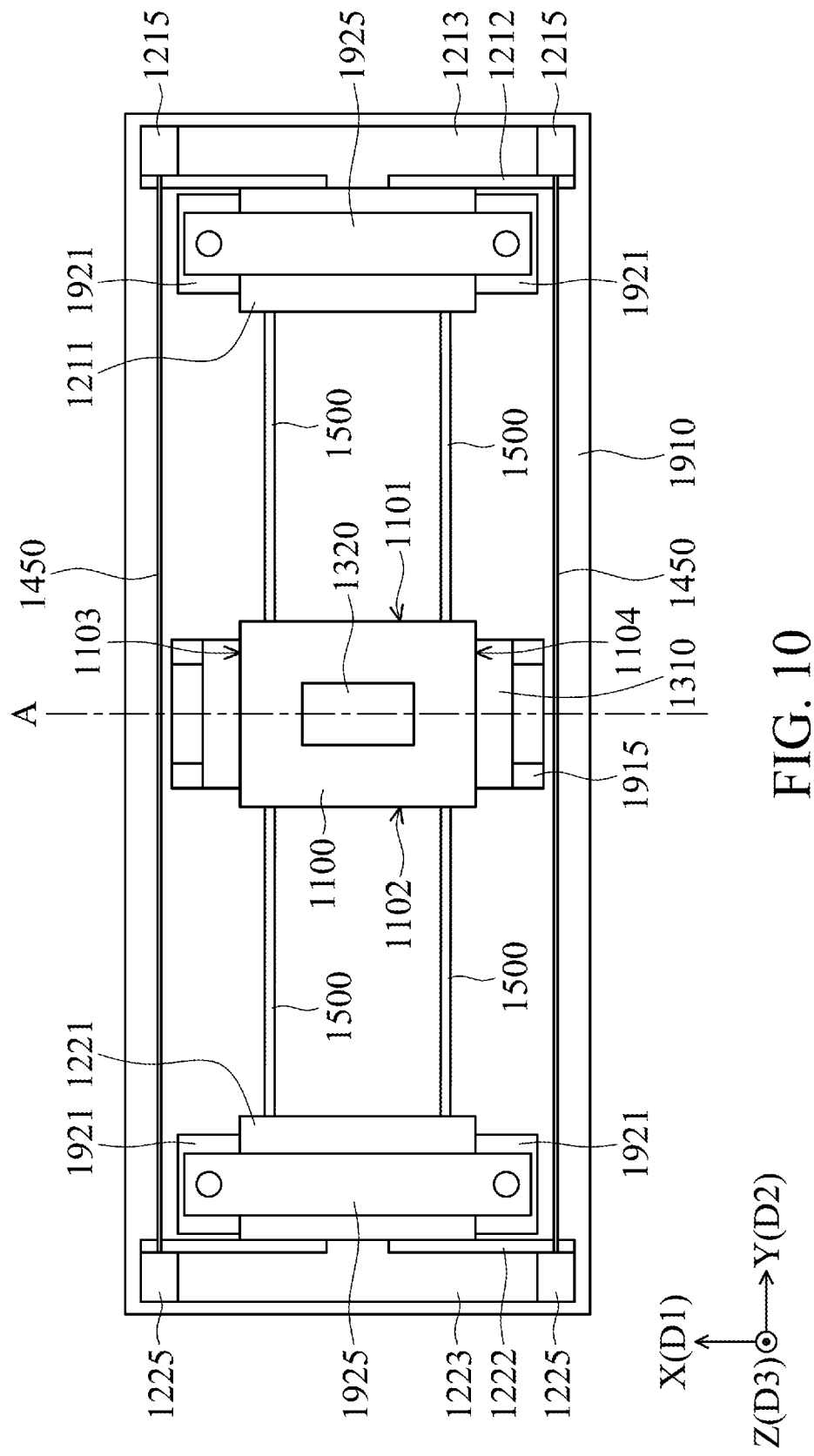
FIG. 10 is a top view of the driving mechanism, according to some different embodiments of the present disclosure.

Referring to FIG. 8 to FIG. 10, FIG. 8 to FIG. 10 respectively show a perspective view, an exploded view, and a top view of the driving mechanism 2000, according to some different embodiments of the present disclosure. The driving mechanism 2000 shown in FIG. 8 to FIG. 10 are similar to the driving mechanism 1000 shown in FIG. 1 to FIG. 3. The difference between them is that, in the driving mechanism 2000, the coil 1310 of the first driving assembly 1300 is disposed inside the concave portion 1915 of the bottom 1910, and the magnetic element 1320 is embedded in the first movable portion 1100.

As shown in FIG. 9, the coil 1310 of the driving mechanism 2000 may be disposed onto a winding shaft in the middle and affixed inside the concave portion 1915, or it may be disposed in the concave portion 1915 by any suitable method. In the driving mechanism 2000, the circuit (e.g. for transmitting control signals) that is electrically connected to the coil 1310 may be embedded in the bottom 1910, so it does not need to be electrically connected through the resilient elements 1500. The magnetic element 1320 is embedded at the center of the first movable portion 1100, moving together with the first movable portion 1100. In the first direction D1, the length of the magnetic element 1320 is smaller than the length of the coil 1310. However, the size shown in FIG. 9 is not for limiting. The coil 1310 and the magnetic element 1320 may be sized according to user requirements.

The other components of the driving mechanism 2000 (e.g. the second movable portion 1200, the second driving assembly 1400, the guiding assembly 1920, etc.) are disposed similarly as those in the driving mechanism 1000. Thus, it is not repeated herein.

Figure 11A:
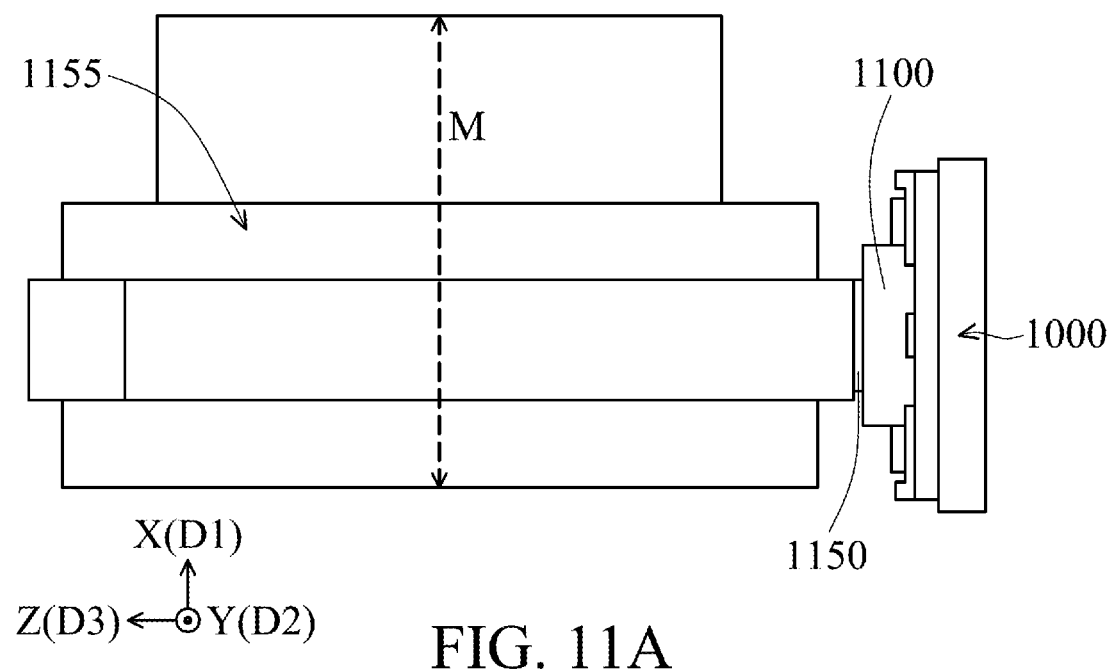
FIG. 11A and FIG. 11B respectively show schematic views of the driving mechanism that drives an object to move in different directions, according to some embodiments of the present disclosure.
Figure 11B:
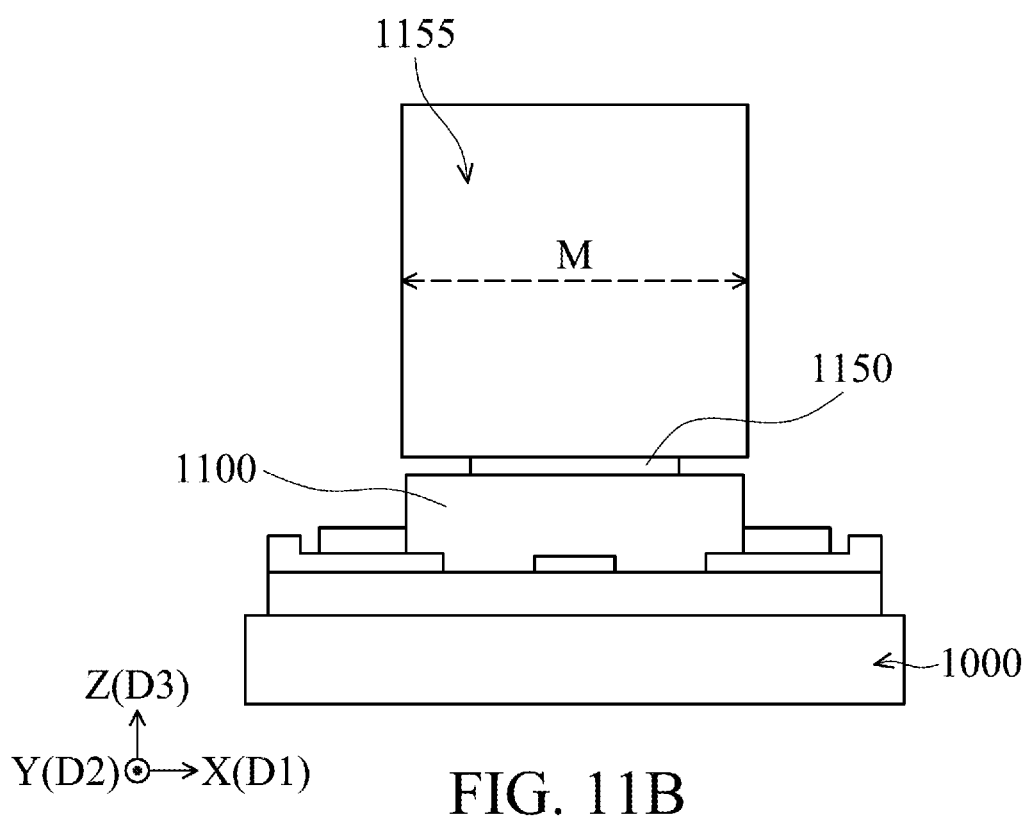

Referring to FIG. 11A and FIG. 11B, FIG. 11A and FIG. 11B respectively show schematic views of the driving mechanism 1000 that drives an object 1155 to move in different moving directions M, according to some embodiments of the present disclosure. In some embodiments, the first movable portion 1100 of the driving mechanism 1000 may be connected to a holder 1150 for holding the object 1155 that is to be moved. In some embodiments, the object 1155 may be an optical element, a lens, or any object that needs to be move reciprocally. In the embodiments shown in FIG. 11A and FIG. 11B, the moving directions M of the object 1155 are both parallel to the first direction D1, which is the same as the moving direction of the first movable portion 1100 mentioned above. As shown in FIG. 11A and FIG. 11B, the moving direction M of the object 1155 may be parallel to or perpendicular to the gravity, depending on user requirements. In the embodiments where the moving direction M of the object 1155 is parallel to the gravity, the process where the first movable portion 1100 returns to the initial position from the first terminal position or from the second terminal position may be affected by gravity. Therefore, in such embodiments (e.g. the embodiment shown in FIG. 11A), the resilient elements 1500 closer to +X direction and the resilient elements 1500 closer to −X direction may have different resilient coefficients (e.g. in FIG. 3, the upper resilient elements 1500 and the lower resilient elements 1500 may have different resilient coefficients), making sure the first movable portion 1100 is able to return to the initial position at the center.

In summary, the driving mechanism (e.g. the driving mechanism 1000, the driving mechanism 1000', the driving mechanism 2000, etc.) provided in the present disclosure includes both the first driving assembly 1300 and the second driving assembly 1400 for determining the moving direction of the first movable portion 1100 and further increasing the weight that can be driven. As such, a greater driving efficiency may be achieved in a limited volume, which is helpful for mechanism miniaturization.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. A driving mechanism, comprising:
   a fixed portion;
   a first movable portion moving relative to the fixed portion in a first direction; and
   a first driving assembly driving the first movable portion to move relative to the fixed portion in the first direction;
   wherein the first driving assembly includes a coil and a magnetic element corresponding to the coil;
   further comprising:
   a second movable portion moving relative to the fixed portion in a second direction;
   a second driving assembly driving the second movable portion to move relative to the fixed portion in the second direction, wherein the second direction is perpendicular to the first direction; and
   a plurality of resilient elements, wherein each resilient element has one end connected to the first movable portion and another end connected to the second movable portion;
   wherein parts of the resilient elements are disposed on a first side of the first movable portion in the second direction, and the other parts of the resilient elements are disposed on a second side of the first movable portion in the second direction, and wherein the number on the first side is the same as the number on the second side.

2. The driving mechanism as claimed in claim 1, wherein the second movable portion comprises:
   a first movable base, disposed on the first side of the first movable portion, and connected to the first movable portion via one or more of said resilient elements; and
   a second movable base, disposed on the second side of the first movable portion, and connected to the first movable portion via one or more of said resilient elements;
   wherein the first movable base and the second movable base are disposed symmetrically about a central axis of the first movable portion.

3. The driving mechanism as claimed in claim 2, wherein the fixed portion comprises:
   a bottom, including a concave portion, wherein the position of the concave portion corresponds to the position of the first movable portion; and
   a guiding assembly, disposed on the bottom, corresponding to the second movable portion and guiding the movable portion to move in the second direction.

4. The driving mechanism as claimed in claim 3, wherein the guiding assembly comprises:
   a plurality of guiding portions, respectively corresponding to the first movable base and the second movable base, limiting the movement of the first movable base and the second movable base in the first direction; and
   a plurality of limiting portions, respectively connected to the guiding portions, limiting the movement of the first movable base and the second movable base in a third direction that is perpendicular to the first direction and to the second direction.

5. The driving mechanism as claimed in claim 4, wherein the coil of the first driving assembly is disposed on the first movable portion, and the magnetic element is disposed inside the concave portion;
   wherein the length of the coil is smaller than the length of the magnetic element in the first direction.

6. The driving mechanism as claimed in claim 5, wherein the coil comprises:
   a first outlet, disposed on the first side of the first movable portion, electrically connected to one of the resilient elements that is located on the first side; and
   a second outlet, disposed on the second side of the first movable portion, electrically connected to one of the resilient elements that is located on the second side;
   wherein the first outlet and the second outlet do not overlap when viewed in the first direction, the second direction, and the third direction.

7. The driving mechanism as claimed in claim 4, wherein the coil of the first driving assembly is disposed inside the concave portion, and the magnetic element is embedded in the first movable portion;
   wherein the length of the magnetic element is smaller than the length of the coil in the first direction.

8. The driving mechanism as claimed in claim 5, wherein the height of the resilient element is smaller than the height of the guiding portions in the third direction.

9. The driving mechanism as claimed in claim 8, wherein the height of the second driving assembly is smaller than the height of the guiding portions in the third direction.

10. The driving mechanism as claimed in claim 5, wherein the first movable portion has a first terminal position and a second terminal position in the first direction relative to an initial position of the first movable portion;
    wherein the distance between the first terminal position and the second terminal position in the first direction is longer than the maximum length of the concave portion in the first direction.

11. The driving mechanism as claimed in claim 10, wherein the distance between the first terminal position and the second terminal position in the first direction is longer than the maximum length of the first driving assembly in the first direction.

12. The driving mechanism as claimed in claim 10, wherein when the first movable portion is in the initial position, the first movable portion is driven by the first driving assembly to move toward the first terminal position or toward the second terminal position, then the second movable portion is driven by the second driving assembly, so that the resilient elements that connect the first movable portion and the second movable portion deform, and the deformation of the resilient elements brings the first movable portion to continue moving toward the first terminal position or toward the second terminal position, until the first movable portion reaches the first terminal position or the second terminal position.

13. The driving mechanism as claimed in claim 12, wherein when the first movable portion is in the first terminal position or the second terminal position, the first movable portion returns to the initial position via the resilient restoring force of the resilient elements and the driving force of the first driving assembly.

14. The driving mechanism as claimed in claim 5, wherein the second movable portion further comprises:
   a first extension portion connected to the first movable base;
   a first conductive portion, partially disposed on the first extension portion and partially embedded in the first movable base;
   a second extension portion connected to the second movable base; and
   a second conductive portion, partially disposed on the second extension portion and partially embedded in the second movable base.

15. The driving mechanism as claimed in claim 14, wherein:
   in the first direction, the length of the first extension portion is longer than the length of the first movable base; and
   in the first direction, the length of the second extension portion is longer than the length of the second movable base.

16. The driving mechanism as claimed in claim 14, wherein:
   the first conductive portion has a first clamping structure that is electrically connected to the second driving assembly; and
   the second conductive portion has a second clamping structure that is electrically connected to the second driving assembly.

17. The driving mechanism as claimed in claim 14, wherein:
   the first movable base, the first extension portion, and the first conductive portion are formed integrally; and
   the second movable base, the second extension portion, and the second conductive portion are formed integrally.

18. The driving mechanism as claimed in claim 14, wherein the second driving assembly comprises:
   a plurality of driving elements, including a shape memory alloy, wherein each of the driving elements has a line structure, having one end that is electrically connected to the first conductive portion and another end that is electrically connected to the second conductive portion.

19. The driving mechanism as claimed in claim 18, wherein parts of the driving elements are disposed on a third side of the first movable portion in the first direction, and the other parts of the driving elements are disposed on a fourth side of the first movable portion in the first direction, and wherein the number on the third side is the same as the number on the fourth side.

* * * * *